UNITED STATES PATENT OFFICE.

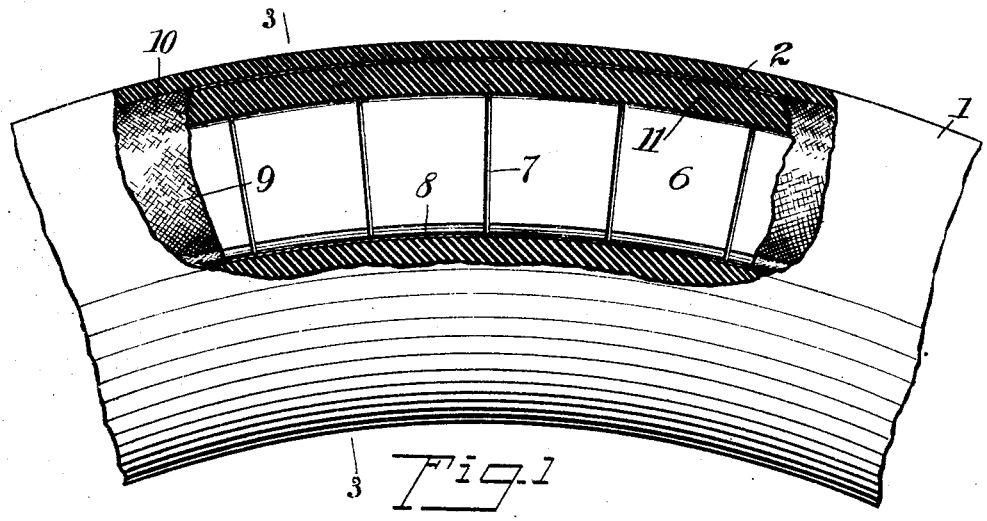
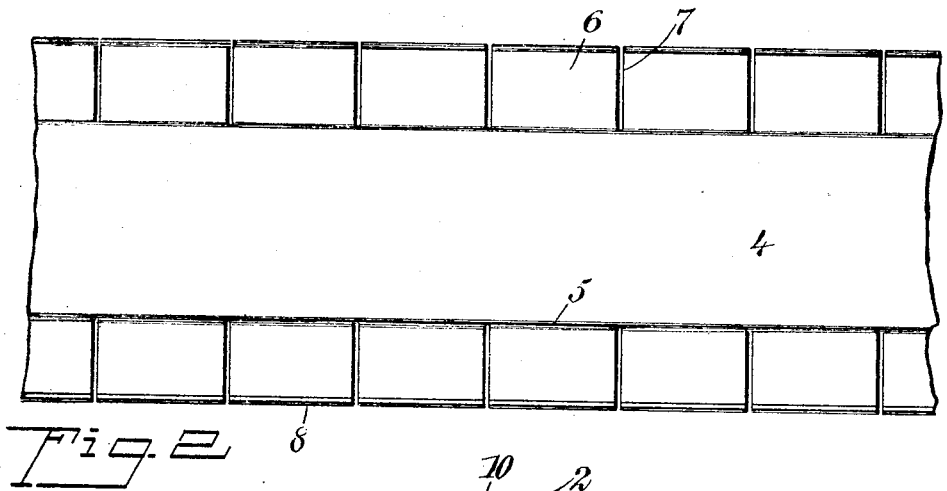
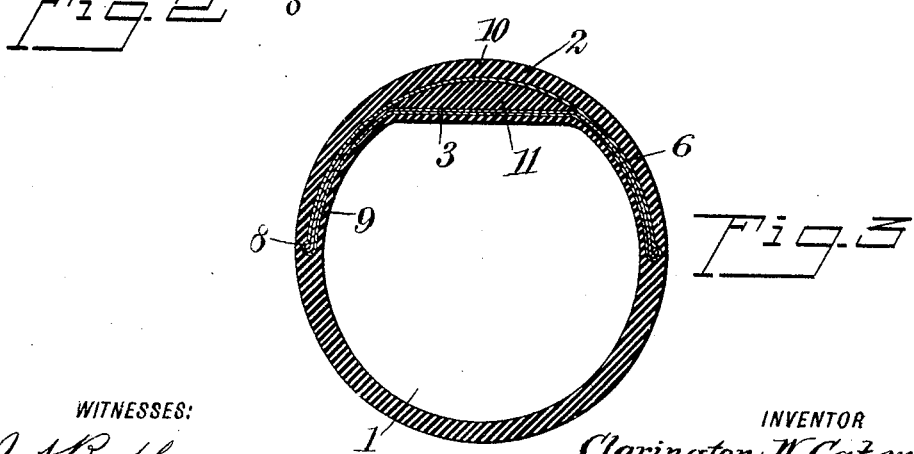

CLARINGTON WILLIAM CATERSON, OF FRANKLIN FORKS, PENNSYLVANIA.

ARMORED TIRE.

No. 803,989.      Specification of Letters Patent.      Patented Nov. 7, 1905.

Application filed January 25, 1905. Serial No. 242,591.

*To all whom it may concern:*

Be it known that I, CLARINGTON WILLIAM CATERSON, a citizen of the United States, and a resident of Franklin Forks, in the county of Susquehanna and State of Pennsylvania, have invented a new and Improved Armor-Tire, of which the following is a full, clear, and exact description.

This invention relates to the tires of vehicles, and especially to pneumatic tires.

The object of the invention is to produce an improved tire of the class popularly known as "armor-tires," the purpose being to present a substantially non-puncturable pneumatic tire which will have all of the resilience and usual qualities of an ordinary pneumatic tire.

Reference is to be had to the accompanying drawings, which form part of this specification, in which drawings like characters of reference indicate like parts in the several views, and in which—

Figure 1 is a side elevation of a short portion of a tire constructed according to my invention, certain parts being broken away and shown in section, as will appear. Fig. 2 is a developed plan of a short portion of the armor-strip, and Fig. 3 is a cross-section taken substantially upon the line 3 3 of Fig. 1.

Referring more particularly to the parts, 1 represents the body of the tire, which is of the usual form found in tires of this class, consisting, as it does, of an endless rubber tube.

In applying my invention I embed in the outer side or tread 2 of the tire a protective strip 3. This protective strip is preferably of metal and may be steel, iron, copper, brass, or similar material. The body 4 of this protective strip consists of a substantially flat band of less width than the diameter of the tire, as shown. As indicated in Fig. 3, the width of this band 4 is preferably substantially half that of the diameter of the tire. From the side edges 5 of the band 4 the material of the strip is bent downwardly, as shown in Fig. 3, so as to present curved wings 6, which conform substantially in outline to the curvature of the tire, as viewed in section. These wings are integral with the body 4 and are produced by making incisions 7 at opposite points, which extend outwardly from the side edges 5, as indicated. These incisions are preferably an equal distance apart for the sake of uniformity.

The lower edges of the wings 6 are preferably crimped, as shown in Fig. 3, to form a wire edge or bead 8. This bead operates effectively to prevent the raw edge of the strip from cutting the material of the body of the tire.

The protective strip would be embedded in the tire in the relation indicated in Fig. 3— that is, with the central band 4 centrally disposed beneath the tread of the tire. From this arrangement the wings 6 described above would be disposed at the side of the tire and embedded in the body thereof, as will be readily understood. The protective strip will be completely incased in a sheath 9 or cover of cotton-duck or similar material, and the outer portion 10 of this sheath is separated from the flat band 4, so as to leave a space of segmental section between the edges 5, it being understood that the material of the outer portion 10 between the edges 5 will conform substantially to the curvature of the tire. This space just referred to will be filled with a packing 11 of some suitable material, such as fiber, cotton, oakum, or similar material.

The advantages of a tire constructed in the manner described are very apparent. The fact that the body of the protective strip is substantially flat allows it to be flattened readily in a longitudinal direction along the ground-line as the tire advances. Such would not be the case if the curved form at the sides were to continue at the tread. While the principal risk of puncture occurs at this part, the sides of the tire are also protected by reason of the wings 6. By reason of the incisions separating the wings the protective band does not offer any substantial resistance to the longitudinal flexion which takes place constantly at the tread on the ground-line. The material of the protective strip being resilient it enables the wings individually to adjust themselves constantly at the tread and on the ground-line to the constantly-changing form of the tire. Thus it will be seen that a protective strip of the form described can readily adjust itself to the longitudinal and transverse flattening which occurs at the lower portion of the tire on account of the weight supported. There is, then, of course no stiffness resulting, and the tire constructed substantially as described has all the resiliency and other qualities of an ordinary pneumatic tire.

While this tire is capable of use in vehicles of all kinds, it is especially adapted for use as an automobile-tire or as a bicycle-tire.

Having thus described the preferred form of my invention, what I claim as new, and desire to secure by Letters Patent, is—

A pneumatic tire consisting of a tubular rubber body and an armor-strip embedded therein, said armor-strip having a substantially flat band with laterally-projecting curved wings conforming to the curvature of the side walls of said body, and a sheath enveloping said strip, the outer portion of said sheath being disposed at a distance from the outer face of said band whereby a space is formed therebetween, and a packing of a fibrous material in said space.

In testimony whereof I have signed my name to this specification in the presence of two subscribing witnesses.

CLARINGTON WILLIAM CATERSON.

Witnesses:
 ISRAEL MONROE,
 LEONARD D. WATSON.